(12) United States Patent
Fourcot et al.

(10) Patent No.: US 6,180,074 B1
(45) Date of Patent: Jan. 30, 2001

(54) METHOD FOR PROCESSING FLUE GASES CONTAINING SULPHUR OXIDES

(75) Inventors: Fabrice Fourcot, Orsay; Jean-Claude Pouxviel, Trelissac, both of (FR)

(73) Assignee: Novacarb, Courbevoie Cedex (FR)

( * ) Notice: Under 35 U.S.C. 154(b), the term of this patent shall be extended for 0 days.

(21) Appl. No.: 09/068,029

(22) PCT Filed: Oct. 31, 1996

(86) PCT No.: PCT/FR96/01719

§ 371 Date: Aug. 14, 1998

§ 102(e) Date: Aug. 14, 1998

(87) PCT Pub. No.: WO97/16376

PCT Pub. Date: May 9, 1997

(30) Foreign Application Priority Data

Oct. 31, 1995 (FR) .................................................. 95 12975

(51) Int. Cl.[7] .......................... B01D 53/34; B01D 53/50; C01D 5/00
(52) U.S. Cl. ..................... 423/210; 423/199; 423/243.06; 423/243.08; 423/244.07; 423/244.08; 23/296; 23/302 T
(58) Field of Search .................. 423/243.04, 243.08, 423/244.07, 244.08, 199, 210, 243.06; 23/302 T, 296

(56) References Cited

U.S. PATENT DOCUMENTS

| | | | |
|---|---|---|---|
| 3,622,443 | * 11/1971 | Galeano | 162/36 |
| 3,880,629 | * 4/1975 | Dulin et al. | 65/27 |
| 3,944,650 | * 3/1976 | Hirota et al. | 423/242 |
| 4,247,525 | * 1/1981 | Voeste | 423/242 |
| 4,385,039 | 5/1983 | Lowell | 423/242 |
| 4,873,065 | * 10/1989 | Braun et al. | 423/210 |
| 5,980,848 | * 11/1999 | Kresnyak et al. | 423/243.04 |

FOREIGN PATENT DOCUMENTS

| | | | |
|---|---|---|---|
| 0 015 626 A2 | 9/1980 | (EP) . | |
| 0 552 660 A1 | * 7/1993 | (EP) | 423/244.07 |
| 1 178 417 | 5/1959 | (FR) . | |
| 2 106 489 | 4/1983 | (GB) . | |
| 44-8095 | * 4/1969 | (JP) | 23/302 T |

OTHER PUBLICATIONS

Riegel *Industrial Chemistry*, 5th Edition Published by Reinhold Publishing Corp. New York N.Y. U.S.A.; pp. 58–64 and 196–197, 1949.*

Chemical Abstracts, vol. 82, No. 18, May 5, 1975, Columbus, Ohio, Abstract No. 82 115559, Y. Tamotsu et al, "Desulfurization of flue gas by active soda ash", XP002007308, see abstract for Nagoya Kogyo Daigaku Gakuho, vol. 25—1973, pp. 395–403.

Chemical Abstracts, vol. 84, No. 2, Jan. 12, 1976, Columbus, Ohio, Abstract No. 84 8708, XP002007309 see abstract for JP 50 102 578 A (Hitachi Ltd) Aug. 13, 1975.

* cited by examiner

*Primary Examiner*—Steven P. Griffin
*Assistant Examiner*—Timothy C Vanoy
(74) *Attorney, Agent, or Firm*—Burns, Doane, Swecker & Mathis, L.L.P.

(57) ABSTRACT

A method for removing contaminants, such as sulfur dioxide, mercury and hydrochloric acid, out of flue gases is provided, said method including the steps of: treating the flue gases with a reagent, such as sodium carbonate, sodium bicarbonate and ammonium salts or mixtures thereof; selectively dissolving the sodium phosphates produced thereby in water; separating out the solids remaining in suspension in the solution; and crystallizing the purified sodium sulphate present in the above-mentioned solution. The sodium sulfate can be upgraded in glass working furnaces. The reagent can be obtained by heating an intermediate solution containing sodium bicarbonate; sodium carbonate; ammonium bicarbonate and ammonium carbonate, which was obtained from the Solvay process for manufacturing sodium carbonate.

17 Claims, No Drawings

METHOD FOR PROCESSING FLUE GASES CONTAINING SULPHUR OXIDES

This application is a national stage filing under 35 U.S.C. §371 of PCT/FR96/01719, filed Oct. 31, 1996.

The present invention relates to a processing of flue gases essentially comprising sulphur oxides, and, to a lesser extent, metals considered as being toxic, as well as acids, of formula HX, in which X represents a halogen.

Many processes produce flue gases containing sulphur oxides and other organic or inorganic contaminants, as well as metals considered as being toxic. This is more particularly the case with power stations and glassworking furnaces, depending on the quality of the fuel and the starting materials used.

On account of the increasing pressure exerted in terms of environmental regulations regarding installations which produce such emissions, methods for processing acidic flue gases are undergoing considerable development.

The standard processing methods by neutralization with lime, either by a dry or semi-wet route, generate a large amount of solid waste composed mainly of gypsum polluted with metals considered as being toxic, such as lead, cadmium and aluminum, for example.

U.S. Pat. No. 4,385,039 describes the processing of gases comprising compounds of the SOx type with a reagent which can be regenerated, and chosen from sodium carbonate activated by heat treatment, sodium bicarbonate or trona, alone or mixed. The solid residues obtained from the processing of the gases are then dissolved using an alkaline solution comprising a boron compound and aqueous ammonia. The resulting solution is then carbonated so as to precipitate sodium carbonate and/or sodium bicarbonate, which are then reused in the processing of the gases. However, this method always produces a large amount of solid waste (gypsum) which is polluted with metals considered as being toxic and cannot be upgraded. The reason for this is that this method involves a step of precipitation, with lime, of the sulphates remaining in the solution after separating out the precipitated carbonate and/or bicarbonate.

Given the composition of this waste and the highly water-soluble nature of the polluting metal elements, legislation requires them to be placed in a controlled dumping site, after immobilization.

This is a considerable inconvenience since not only is such processing expensive, but also a huge tonnage of waste is produced. Furthermore, there is no means for easily upgrading one or more products resulting from such processing.

The subject of the present invention is thus to propose a method for processing flue gases mainly comprising compounds of the SOx type, and metals considered as being toxic, this method not having the abovementioned drawbacks.

Thus, the method according to the invention makes it possible to process such flue gases with a reagent which is more effective than lime, hence used in lower molar amounts, and chosen such that the waste produced during the neutralization of these gases can be recycled easily and economically.

These aims and others are achieved by the present invention, which relates to a method for processing flue gases comprising compounds of the SOx type, by a dry or semi-wet route, this method consisting in carrying out the following steps:

the said flue gases are treated with a reagent chosen from sodium carbonate, sodium bicarbonate and mixtures thereof, the sodium sulphates produced are selectively dissolved in water, the solids remaining in suspension in the solution are separated out, and the purified sodium sulphate present in the abovementioned solution is crystallized.

However, other advantages of the present invention will emerge more clearly on reading the description and the examples which follow.

As has been mentioned previously, the method according to the invention is directed towards the processing of flue gases mainly comprising gases of the SOx type. The term SOx as used here refers to the species $SO_2$ and $SO_3$. The flue gases can also comprise sulphites and/or bisulphites.

The flue gases processed by the method according to the invention also comprise metals considered as being toxic. The expression "metals considered as being toxic" is used here to refer to metals considered as being toxic and/or polyvalent metals. More particularly, but without any intention of being limiting, mention may be made of mercury, cadmium, lead, arsenic, selenium, silver, tin, antimony, zinc, aluminum, silicon, calcium, titanium, chromium, manganese, iron, nickel, copper, molybdenum, bismuth, vanadium and cobalt.

The flue gases processed according to the method of the invention can also comprise, to a lesser extent, compounds of the Nox type and acids of formula HX in which X represents a halogen atom. More particular, the halogen atom is chlorine or fluorine.

The flue gases can also contain organic contaminants, in particular such as dioxins or furans.

Besides the contaminants which have just been mentioned, the said flue gases can also comprise dusts or fly ash.

The flue gases are thus treated, by a dry or semi-wet route, with a reagent chosen from sodium carbonate, sodium bicarbonate and mixtures thereof.

The term dry route is used here to denote more particularly processing in which the reagent is introduced in the solid state into the flue gases.

When the processing carried out is the dry route, two types of implementation can be distinguished, the first variant being free of water and the second variant being carried out in the presence of water.

According to the first variant of the dry-route method, anhydrous reagents are used more particularly.

According to the second variant of the dry-route method, the flue gases are placed in contact with an abovementioned reagent, in the presence of water but with an amount such that the reagent retains its powdery appearance. The reagent used can be in anhydrous form or can comprise water of crystallization.

The water can be provided in the method in several ways. In particular, it can be present intrinsically in the reagent or can be provided extemporaneously, before processing the flue gases or during their processing. Needless to say, combining these possibilities can be envisaged.

When the reagent comprises water of crystallization, it can be envisaged not to provide the water extemporaneously and to carry out the processing only in the presence of the reagent's water of crystallization.

However, according to a preferred embodiment of the invention, the water is provided extemporaneously, whether the reagent comprises water of crystallization or not. In this case, the water content is between 2 and 15% by weight relative to the reagent.

The term semi-wet route is used here to denote a method in which the reagent is introduced in the presence of water in an amount such that the products obtained after processing are in a solid form. In this case, the reagent is used in the form of a suspension or a solution.

The water content required to obtain a solution or a suspension of the reagent can be determined by a person skilled in the art on the basis of the technological constraints of the method. More particularly, this content depends on the processing temperature of the flue gases, the evaporation capacity of the apparatus and the fact that it is desired to obtain a solid product after the said processing.

When the reagent is in solid form, it may be preferable to use a product of fine and controlled particle size, so as to improve the kinetic of the neutralization processing.

As a guide, it is preferred to use a reagent whose average particle size is less than 50 μm. According to a more specific embodiment, a reagent whose average particle size is between 5 and 30 μm is used.

If a reagent with a particle size greater than or about 50 μm is used, it may be advantageous to carry out, prior to the processing of the flue gases, a step of grinding of the said reagent in order to reach a particle size of about 5 to 30 μm. Such a step can be carried out by any standard means known to those skilled in the art.

The carbonates and bicarbonates present on the market are suitable for carrying out the present invention.

The sodium carbonate used in the method is more particularly light sodium carbonate. The latter may or may not comprise water of hydration. By way of example, anhydrous, monohydrated, heptahydrated or decahydrated sodium carbonate is suitable for carrying out the invention, it being possible for these compounds to be used alone or as a mixture.

It is likewise possible to envisage carrying out the method according to the invention with a reagent such as sodium sesquicarbonate, which corresponds to an equimolar mixture of sodium bicarbonate and carbonate comprising two molecules of water.

According to a preferred variant of the invention, a reagent chosen from sodium bicarbonate, or a sodium bicarbonate/sodium carbonate mixture in which the molar proportion of bicarbonate is greater than that of the sodium carbonate, is used. As a guide, the processing is carried out with a reagent comprising at least 70% sodium bicarbonate.

According to another preferred variant of the invention, the reagent used can comprise at least ammonia in the form of ammonium salts such as bicarbonate, carbonate and/or carbamate.

This reagent can also comprise carbamate salts and water.

The sodium bicarbonate content is advantageously at least 70% by weight, preferably at least 80% by weight and more particularly between 80 and 95% by weight. The amount of sodium carbonate present is advantageously less than 30% by weight, preferably less than 20% and more particularly between 5 and 15% by weight. The ammonia, expressed in the form of ammonium ion, is preferably present at less than 1% by weight and more particularly between 0.2 and 0.7% by weight.

The ammonium carbamate content is preferably less than 0.1% by weight and more preferably between 0.01 and 0.06% by weight. The water is preferably present in an amount of less than 10% by weight and more preferably from 1 to 6% by weight.

According to a particularly advantageous variant, a mixture comprising sodium carbonate and bicarbonate, obtained by a thermal treatment of ammoniacal bicarbonate, at a temperature ranging between 20 and 150° C., preferably between 20 and 130° C., under a controlled atmosphere optionally comprising carbon dioxide and/or water, can be used.

The thermally-treated ammoniacal bicarbonate is the intermediate product obtained by carrying out the process for the preparation of sodium carbonate via the technique using ammonia soda, also known as the "Solvay process".

More precisely, for the purposes of the present invention, the term ammoniacal bicarbonate refers to the product obtained after dissolution of ammonia gas in an aqueous solution of sodium chloride, so as to produce an ammoniacal brine. This is then treated with a gas containing carbon dioxide in order to give crystals of ammoniacal bicarbonate.

Ammoniacal bicarbonate in fact denotes a mixture mainly comprising sodium bicarbonate, sodium carbonate and, in a smaller amount, ammonia in the form of ammonium salts such as bicarbonate, carbonate and/or carbamate, and water.

As a guide, the composition of this mixture is as follows: 70 to 90% by weight of sodium bicarbonate ($NaHCO_3$), 2 to 20% by weight of sodium carbonate ($Na_2CO_3$), 0.2 to 1.0% by weight of ammonia expressed in the form of ammonium ion, 0.3 to 2.0% by weight of ammonium carbamate ($NH_4O_2CNH_2$) and 5 to 20% by weight of water.

More particularly, the thermal treatment is carried out in the presence of an atmosphere comprising water vapour in a content of between 0 and 10 mol %.

Moreover, the thermal treatment is carried out in the presence of an atmosphere comprising a carbon dioxide content of between 0 and 100 mol %.

The remainder required to reach the desired total pressure is advantageously provided, if necessary, by air or any gas, for instance an inert gas such as the rare gases, or nitrogen.

It should be noted that the thermal treatment of the ammoniacal bicarbonate can be carried out at any pressure.

The thermal treatment is preferably carried out in the presence of water vapour and carbon dioxide.

The processing according to the invention is preferably carried out under a flow of gas, and with stirring.

It has been observed that the processing temperature of the ammoniacal bicarbonate can be adapted to suit the amount of water vapour and carbon dioxide present.

Thus, when the atmosphere is a nitrogen/oxygen mixture or air, the temperature range for the thermal treatment will preferably be less than 80° C.

Moreover, if the processing is carried out under a mixture of carbon dioxide and water vapour, it may then be envisaged to carry out this processing at a temperature close to 120–130° C., although lower temperatures remain possible.

For what has been stated hereinabove, the temperature values are expressed at atmospheric pressure. A person skilled in the art is capable of adapting the temperature values to the pressure at which the processing is carried out.

Usually, the duration of the operation is not more than a few hours.

The amount of reagent used in the method for processing flue gases according to the invention depends on the amount of compounds present to be neutralized. The expression "compounds to be neutralized" refers especially to the main compounds, i.e. to the SOx and, if applicable, to the acids HX.

According to a specific embodiment of the invention, the flue gases are processed such that the stoichiometric ratio between the reagent and the compounds of SOx type, and, if applicable, the acids of formula HX, is between 1.02 and 2.

The said stoichiometric ratio is preferably between 1.02 and 1.5.

If the flue gases to be processed comprise organic contaminants and mercury, it may be advantageous to inject an adsorbing agent into the gas stream, with the reagent and optionally the water. The adsorbing agent comprising the organic contaminants can then be recovered with the solids obtained from processing of the flue gases. The adsorbing agent is generally active charcoal and/or lignite coke.

It should be noted that if the flue gases comprise dusts or fly ash, these can be recovered with the solids produced, during neutralization, or else prior to the processing according to the invention, by standard methods.

The said flue gases are placed in contact with the reagent, optionally the water and the adsorbing agent in a known manner.

Thus, it can take place under co-current or counter-current conditions.

The processing can likewise be carried out in any type of reactor which promotes dispersion of the solid, the suspension or the solution in the flue gases, such as reactors comprising Venturi-type systems, or fluidized-bed reactors.

If the second variant of the method via the dry route is carried out, the water can be introduced before the contact with the flue gases occurs. In this case, any known method is suitable. In general, the water in sprayed form and the reagent are brought into contact in a humidifying drum.

Still in the context of this same variant, the water can be introduced as the reagent is being brought into contact with the flue gases. In this case, the water is injected in the amounts required directly into the gas stream.

The solids produced by the method are then separated out using standard techniques such as electrofilters or sleeve filters.

According to an advantageous embodiment of the present invention, at least some of the solids derived from the processing of the flue gases are recycled into a new step of processing of the flue gases.

The processing temperature of the flue gases depends on various technological constraints.

It depends in particular on the temperature of the flue gases to be treated, the water content, the presence of catalytic processing of NOx, and the heat resistance of the apparatus.

As a guide, the processing temperature of the flue gases is between 70 and 500° C. and more particularly between 130 and 400° C.

When processing is carried out in the presence of water provided extemporaneously, the said solids can be recycled to the zone where the reagent/water mixture is prepared.

If the water is placed in contact in the neutralization zone, the solids are introduced into this zone, separately or with the introduction of fresh reagent.

Such an embodiment is advantageous as a means of further increasing the efficacy of the method, in particular in the case of a short residence time in the neutralization zone. This mode likewise makes it possible to lower the purification thresholds of the flue gases.

The solid residues collected are then placed in contact with water or a recycled aqueous solution comprising sodium sulphate.

The aim of this second step is in part to selectively dissolve the sulphates, and the halogenated salts when these are present, which are usually chlorides. In addition, the aim of this step is to leave in suspension most of the metals considered as being toxic.

Such an operation of selective dissolution is carried out by adjusting the pH of the medium to within a range of minimum solubility for the metals, which are in particular in the form of hydroxide and/or carbonates.

It is clear that the range depends on the nature of the metals present and a compromise between each of them may be necessary.

As a general rule, the dissolution is carried out in a pH range of between 3 and 10, these two limits being included.

According to a first variant, if aluminum is not present in a large amount relative to the other metals, a pH range of between 7 and 10, the two limits being included, represents a good compromise. More particularly, the dissolution can be carried out in a pH range of between 7 and 9, these two limits being included.

According to a second variant and when the amount of aluminum is high, it may be desirable to carry out the dissolution at a pH of between 3 and 7, these two limits being included.

It would not constitute a departure from the scope of the present invention to use the abovementioned two variants successively. Thus, the dissolution step can correspond to two successive steps with an intermediate separation step, one carried out at a pH of between 7 and 10, the second at a pH of between 3 and 7, the order depending on the pH value of the initial solution.

The pH value is controlled by adding either an acid or a base, which are chosen so as not to pollute the mixture. Thus, it is preferred to use sulphuric acid or sodium carbonate or bicarbonate.

The step of selective dissolution of the sulphates is carried out, according to a specific embodiment of the invention, at a temperature of between 15 and 80° C., more particularly between 20 and 60° C. One advantageous embodiment consists in carrying out this dissolution at a temperature in the region of 30–40° C.

After the dissolution and when the processed flue gases contain sulphites or bisulphites, an oxidation of the species into sulphates can be carried out. This operation is generally performed by adding at least one oxidizing compound to the mixture, optionally in combination with heating of this mixture. By way of example of oxidizing compounds, mention may be made of air, hydrogen peroxide, persulphates or the salt of Caro's acid.

Once the sodium sulphate has dissolved, the solution is separated from the solids contained therein by filtration or any other standard method.

The solid residues can then be disposed of. It is observed that, at this stage, there is considerably less residue to be disposed of than in the standard methods of neutralizing with lime, and this has been accomplished by a simple method.

The filtrate, corresponding to a purified aqueous solution of sodium sulphate, is then processed so as to crystallize the said sulphate.

This operation can be carried out by any means known to those skilled in the art.

According to a first variant, the filtrate is cooled until a temperature difference of 15 to 20° C. between the dissolution temperature and the crystallization temperature is obtained.

In this case, the crystals obtained are in decahydrate form.

According to a second variant, the sodium sulphate is crystallized by evaporation of at least some of the water from the solution.

The resulting crystals are in anhydrous form.

The liquid resulting from the crystallization can advantageously be recycled into the step for dissolving the solids produced by the step of processing of the flue gases.

Before recycling, it may be advantageous to remove some of this liquid in order to avoid enriching the liquids with metals considered as being toxic, or optionally, in order to process this liquid.

Although such a step is only optional, before crystallizing the sodium sulphate, it is possible to carry out an additional purification of the solution, so as to remove the metals considered as being toxic which may be in solution.

A first method consists in adding to the solution at least one suitable precipitating agent chosen in particular from alkali metal hydroxides, sodium carbonate, sodium bicarbonate and silicates, it being possible for these precipitating agents to be used alone or as a mixture.

As agents of this type, mention may also be made of the products sold under the names PROFIX®, MAX FLOW® and LOW ASH®.

A second method consists in placing the solution in contact with at least one inorganic sulphide, at least one organosulphur compound or a mixture thereof.

Among the inorganic sulphides, mention may be made of hydrogen sulphide, sodium sulphide, iron sulphide or barium sulphide.

As examples of organosulphur products, mention may be made in particular of the trisodium salt of trimercapto-S-triazine, as a 15% solution in water (TMT15®).

A third suitable method consists in placing the solution in contact with an ion-exchange resin. According to this variant, resins in hydrogen or sodium form are more particularly used. For the second type, resins which allow optimum extraction of the ions of the metals considered as being toxic, which are present in the solution, are preferred.

The purity of these crystals is such that they can be upgraded directly or after drying or granulation.

The sodium sulphate can in particular be upgraded in glassworking furnaces, for example.

Concrete examples of the invention will now be presented.

EXAMPLE 1

The dissolution tests were carried out using 152.3 g of slag obtained from the processing of flue gases from glassworking furnaces with sodium bicarbonate.

The dissolution is carried out at a temperature of about 35° C., in the presence of 2.16 litre/kg of slag.

The solution is then cooled to 20° C. in order to crystallize the sodium sulphate.

Table 1 below summarises the behaviour of the metals during the dissolution as a function of the pH and of the amount of water added under conditions close to saturation.

TABLE 1

| Test No. | 1 | 2 | 3 |
|---|---|---|---|
| Final pH | 3.32 | 9.5 | 7.4 |
| $Na_2CO_3$/slag (mg/g) | 0 | 6.5 | 2.7 |
| $Fe/SO_4{}^{2-}$ (ppm) | 1422 | not detected | not detected |
| $Cr(VI)/SO_4{}^{2-}$ (ppm) | 8.3 | 14 | 4.2 |
| $Al/SO_4{}^{2-}$ (ppm) | 3.3 | 6.4 | 2.4 |
| Residue/slag (% by weight) | 2.4 | 1.7 | 2.6 |

EXAMPLE 2

This dissolution test was carried out using the same solid as that of Example 1.

152.3 g of slag resulting from the processing of flue gases obtained from glassworking furnaces are dissolved with sodium bicarbonate in 329 ml of water over one hour while maintaining the pH at 7.13.

The amount of residue obtained is considerably reduced since it represents 2.9% by weight of the slag.

The solution obtained is cooled to 20° C. for 5 hours. Crystals are obtained which are then washed with saturated sodium sulphate solution.

The impurity content in the filtrate is 1.6 mg/l of chromium (VI) and the washing waters contain 0.3 mg/l of this impurity.

Crystallization allows sodium sulphate crystals to be obtained, the purity of which is indicated in Table 2 below:

TABLE 2

| Metal | Purity of the solid sulphate |
|---|---|
| Al | <2 ppm |
| Cu | <4 ppm |
| Cr | <2 ppm |

This purity is very satisfactory and allows upgrading of the sodium sulphate obtained to be envisaged. It can also be dried and optionally granulated so as to obtain an anhydrous sodium sulphate which can easily be upgraded.

EXAMPLE 3

233.8 g of slag resulting from the processing of flue gases obtained from glassworking furnaces are dissolved with excess sodium bicarbonate in 468 ml of an aqueous solution containing 160 g/l of sodium sulphate obtained from a prior dissolution step. The dissolution is carried out over one hour while maintaining the pH at 8.

The amount of residue obtained is considerably reduced since it represents 3% by weight of the initial slag.

50 ml of the resulting solution is placed in contact with 0.3 g (Test 2) and with 1.36 g (Test 3) of TMT15® at a temperature of 35° C. and the mixture is left for 5 minutes.

The precipitates are separated out and the filtrates obtained are then analysed. The results are summarized in Table 3 below:

TABLE 3

| Test | Cr (mg/l) | Cu (mg/l) | As (mg/l) | Pb (mg/l) |
|---|---|---|---|---|
| 1 | 7.8 | 3.4 | 0.44 | 34.4 |
| 2 | 4.6 | 0.8 | 0.34 | 1 |
| 3 | 2.4 | 0.8 | 0.3 | 0.6 |

The filtrate obtained is cooled to 20° C. for 5 hours.

Pure crystals are obtained, which are then washed with saturated sodium sulphate solution.

EXAMPLE 4

550.5 g of slag obtained from the processing of flue gases from glassworking furnaces are dissolved with sodium bicarbonate, in 1.19 litres of water, in a reactor fitted with stirring means, over 1 hour at a temperature of 35° C.

A pH of 7 is maintained by addition of sodium carbonate.

The resulting suspension is filtered and a solid residue is obtained, representing 3.2% of the initial slag, which can be disposed of.

The filtrate is recovered and then cooled to 20° C. so as to crystallize the sodium sulphate present.

The crystals are separated out by filtration and then dried. Sodium sulphate decahydrate is recovered.

The purity of the crystals is indicated in Table 4 below:

TABLE 4

| | |
|---|---|
| Al | <40 ppm |
| Cu | <10 ppm |
| Cr | <6 ppm |
| Fe | <4 ppm |
| Cd | 6.9 ppm |
| Zn | 8.9 ppm |
| Pb | 15.8 ppm |

If a higher degree of purity is desired, an additional step of purification of the solution can be carried out before the crystallization.

The analysis of the composition of the filtrate after separation of the crystals is as follows:

TABLE 5

| | |
|---|---|
| Sulphates | 125.4 g/l |
| Al | <4 mg/l |
| Cu | <1 mg/l |
| Cr | 2.4 mg/l |
| Fe | <0.4 mg/l |
| Cd | 0.2 mg/l |
| Zn | 2.7 mg/l |
| Pb | <0.1 mg/l |

0.4 litre of this filtrate is reused in order to dissolve 111.1 g of fresh slag from glassworking furnaces (composition different from that of the previous slags).

The method is carried out as above, with the pH being maintained at 7 by addition of sodium carbonate.

Filtration of the resulting suspension leads to the recovery of a solid, which can be disposed of, representing 3.9% by weight of the slag processed.

The filtrate is cooled to 20° C. and the sodium sulphate decahydrate crystals are then recovered.

The purity of the crystals is indicated in Table 6 below:

TABLE 6

| | |
|---|---|
| Al | <40 ppm |
| Cu | <10 ppm |
| Cr | <6 ppm |
| Fe | <4 ppm |
| Cd | 5 ppm |
| Zn | 7 ppm |
| Pb | 2 ppm |

Here also, if a higher degree of purity is desired, an additional step of purification of the solution can be carried out before the crystallization.

The analysis of the composition of the filtrate after separation of the crystals is as follows:

TABLE 7

| | |
|---|---|
| Sulphates | 129.4 g/l |
| Al | <4 mg/l |
| Cu | <1 mg/l |
| Cr | 0.6 mg/l |
| Fe | <0.4 mg/l |
| Cd | <0.1 mg/l |
| Zn | 1 mg/l |
| Pb | 0.04 mg/l |

As can be seen, the analysis of the composition of this filtrate is very close to that of the filtrate obtained above. There has thus been no enrichment with metals.

Consequently, it is possible to recycle the filtrate into further dissolution steps.

What is claimed is:

1. Method for processing flue gases comprising SOx, said method comprising carrying out the following steps:

treating said flue gases with a reagent which comprises sodium carbonate, sodium bicarbonate and ammonium salts, thereby producing solids comprising sodium sulphates, separating out the solids from the flue gases, selectively dissolving the sodium sulphates in water, separating out the solids remaining in suspension in the solution, and crystallizing the purified sodium sulphate present in said solution.

2. Method according to claim 1, wherein said reagent comprises sodium bicarbonate in an amount that is at least 70% by weight; sodium carbonate in an amount that is less than 30% by weight, and ammonia expressed in the form of ammonium ion, is in an amount that is less than 1% by weight.

3. Method according to claim 1, wherein the reagent further comprises ammonium carbamate and water.

4. Method according to claim 3, wherein the amount of ammonium carbamate present in the reagent is in an amount that is less than 0.1% by weight, and the amount of water present in the reagent is less than 10% by weight.

5. Method according claim 1, wherein the reagent is obtained by a thermal treatment of an ammoniacal bicarbonate, at a temperature of between 20 and 150° C., under a controlled atmosphere comprising carbon dioxide and/or water.

6. Method according to claim 5, wherein the ammoniacal bicarbonate comprises 70 to 90% by weight of sodium bicarbonate, 2 to 20% by weight of sodium carbonate, 0.2 to 1.0% by weight of ammonia expressed in the form of ammonium ion, 0.3 to 2.0% by weight of ammonium carbamate, and 5 to 20% by weight of water.

7. Processing method according to claim 1, wherein the step of selective dissolving of the sodium sulphate is carried out at a temperature of between 15 and 80° C.

8. Processing method according to claim 7, wherein the step of selective dissolving of the sodium sulphate is carried out at a pH in the range of from about 3 to about 10.

9. Method according to claim 8, wherein the step of selective dissolving of the sodium sulphate is carried out at a pH from about 7 to about 10.

10. Method according to claim 8, wherein the step of selective dissolving of the sodium sulphate is carried out at a pH from about 3 to about 7.

11. Method according to claim 10, wherein the step of selective dissolving of the sodium sulphate comprises two steps with an intermediate step of separating out solids remaining in suspension, one of said two steps carried out at a pH of between 7 and 10, the other of said two steps at a pH of between 3 and 7.

12. Processing method according to claim 1, wherein said crystallizing is carried out by cooling the solution to a temperature that is 15 to 20° C. cooler than the temperature at which the selective dissolving step was conducted at.

13. Processing method according to claim 1, wherein the crystallization step is carried out by evaporation of at least some of the water from the solution.

14. Processing method according to claim 13, wherein an additional purification of the solution is carried out, before crystallization of the sodium sulphate.

15. Processing method according to claim 14, wherein said additional purification comprises adding at least one precipitating agent to the solution.

16. Processing method according to claim 14, wherein said additional purification comprises adding at least one inorganic sulphide, at least one organosulphur compound or a mixture thereof to the solution.

17. Processing method according to claim 14, wherein said additional purification comprises adding an ion exchange resin to the solution.

* * * * *